Figure 1:
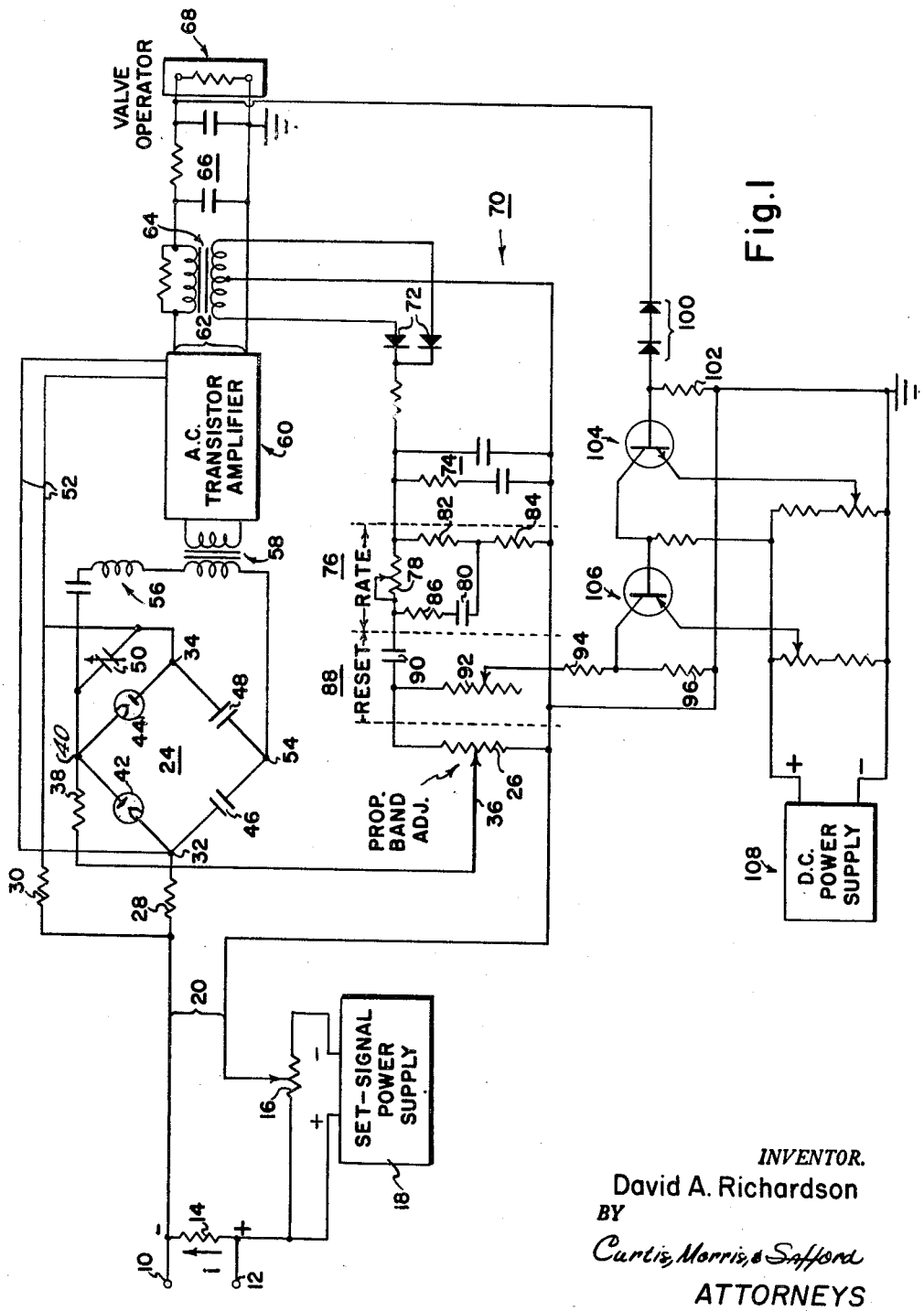

July 27, 1965
Filed May 18, 1961

D. A. RICHARDSON
MEANS FOR PREVENTING RESET WIND-UP IN
ELECTRONIC CONTROL APPARATUS 3,197,711

2 Sheets-Sheet 2

INVENTOR.
David A. Richardson
BY
Curtis, Morris, & Safford
ATTORNEYS

United States Patent Office 3,197,711
Patented July 27, 1965

3,197,711
MEANS FOR PREVENTING RESET WIND-UP IN ELECTRONIC CONTROL APPARATUS
David A. Richardson, Sheldonville, Mass., assignor to The Foxboro Company, Foxboro, Mass.
Filed May 18, 1961, Ser. No. 110,987
20 Claims. (Cl. 330—103)

This invention relates to electronic apparatus for controlling a variable condition of an industrial process, for example a process condition such as temperature, rate of liquid flow and the like. More in particular, this invention relates to such apparatus that is especially useful in controlling bath processes, and is directed to novel means for avoiding the effect often referred to as reset "wind up." The invention is described herein as applied to a general purpose controller of the type disclosed in detail in U.S. Patent 2,956,234, issued to E. Olsen on October 11, 1960.

Many controllers now available commercially are arranged to receive an electrical input signal furnished by a condition-sensing device, and to produce a corresponding electrical output signal for transmission to a remotely-located process valve, etc. Commonly, these controllers are of the proportioning type, i.e. wherein the controller serves to adjust the process valve to a position that is proportional to the value of the measured process condition. If the measured condition varies from its "set point" due to a change in load on the process, a corresponding "deviation" signal is fed to the controller which thereupon counteracts the load change by shifting the process valve so as to tend to return the process condition to its set point.

Proportioning controllers cannot, of course, bring the process condition back precisely to set point, for at that point there would be no deviation signal for maintaining the process valve in its new position. The resulting variation of the controlled condition with changes in load is often referred to as "droop," and the amount of droop the controller permits is determined in part by the amount of signal amplification or "gain" built into the controller. Ideally, a controller should have high gain so that it can shift the process valve a large amount in response to a relatively small change in the measured condition, and thus tend to hold the process condition closely to its set point. Such a controller is said to have a "narrow" proportioning band.

Since it is not possible, for stability reasons, to use narrow proportioning band controllers with certain processes, controllers also are provided with so-called reset action to minimize "droop." In a controller having reset action, the initial change in the controller output signal in response to a change in the process condition may be relatively small, i.e. the amplification is initially low. However, the reset apparatus subsequently causes the controller output signal to gradually increase over a relatively long time period following the change in load on the process. Thus the process valve is gradually shifted further in the desired corrective direction, and the measured process condition ultimately is brought back very nearly to its set point without producing any instability in the process.

In electronic controllers, reset action can conveniently be obtained by applying the deviation signal to an amplifier having a negative feedback circuit which includes a series-connected reset capacitor arranged to charge (or discharge) through a shunt resistor. Immediately after a change in the process condition, i.e. before the reset capacitor has had time to charge, the negative feedback signal will be of substantial size and thereby hold the change in amplifier output signal to a relatively low level. Thereafter, as the reset capacitor charges up, the negative feedback signal will diminish in magnitude, and allow the controller output signal to increase in magnitude. Typically, such reset capacitor circuits have long time-constants, e.g. up to 30 minutes or so.

Controllers of this type have quite satisfactorily been applied to continuous processes. However, difficulties are encountered when a controller having a reset capacitor is used to control a batch process, for example, a process wherein measured portions of primary chemicals are placed in a reaction vessel, and the temperature of this vessel subsequently is raised to a relatively high reaction temperature which must be maintained for a period of time. The difficulties result from the fact that, during the usually considerable time that the process condition is being brought up to set point, the deviation signal will be of substantial magnitude, and as a result an excessively large electrical charge will be built up on the reset capacitor. This result is often referred to as reset "wind up." After the process has reached set point, this charge will still be present, and will adversely affect the controller operation until the charge has been dissipated. Thus, especially because of the relatively long time-constants of reset circuits, considerable time may elapse before the controller is properly in control of the process.

In the embodiment of the invention described herein, there is provided an electronic controller having novel means to maintain a proper electrical charge on the reset capacitor. This controller is, in many respects, fundamentally similar to that disclosed in the above-mentioned Olsen Patent 2,956,234, and reference should be made to that patent for detailed descriptions of certain of the basic controller elements. The controller described hereinbelow additionally includes circuit means coupled to the controller output and operable, whenever the output signal goes beyond a predetermined limiting value, to produce a voltage corresponding to the difference between that limiting value and the actual controller output signal. This voltage is amplified and coupled to the reset capacitor so as to adjust the charge on that capacitor to the value required to maintain the controller output essentially at the selected limiting value. The proportioning action of this additional circuitry for controlling the reset capacitor charge provides desirable stability of operation, while preventing an excessive build-up of charge on the capacitor.

Figure 2:
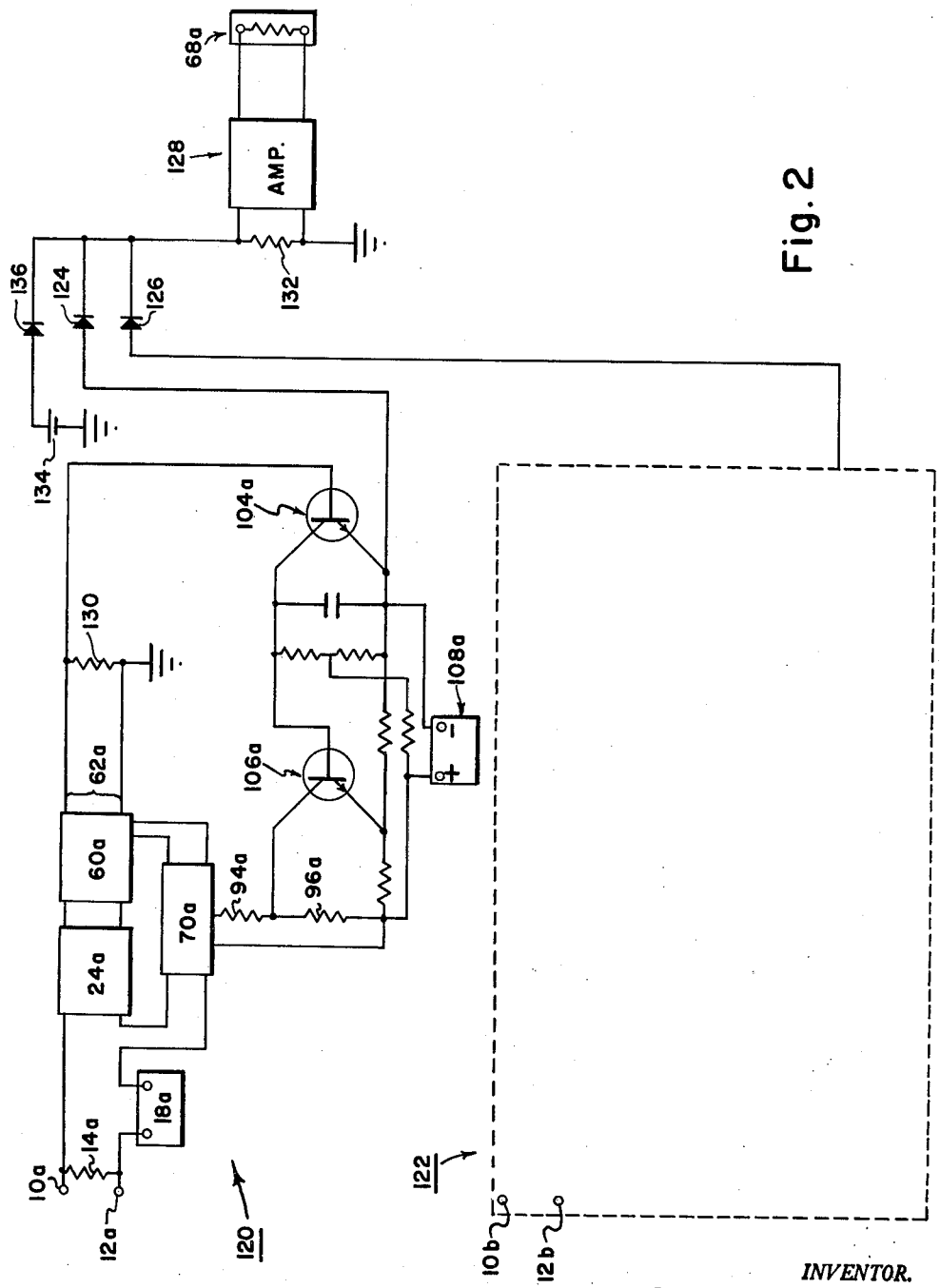

Accordingly, it is an object of this invention to provide novel control apparatus of the electronic type. Another object of this invention is to provide an improved electronic process controller which is particularly suited for use with batch processes. A more detailed object of this invention is to provide means for preventing wind-up of a reset capacitor in an electronic process controller. Other objects, aspects and advantages of the invention will in part be pointed out in, and in part apparent from, the following description considered together with the accompanying drawings, in which:

FIGURE 1 is a schematic circuit diagram of a process controller incorporating the present invention; and FIGURE 2 shows a multiple-controller "auto-selector" system in accordance with this invention.

Referring now to the upper left-hand corner of FIGURE 1, the controller includes a pair of input terminals 10 and 12 adapted to be connected to a two-wire transmission line carrying a D.C. measurement signal corresponding to the value of the variable process condition to be controlled. Connected across the input terminals is a resistor 14, e.g. of 100 ohms, for producing a D.C. measurement voltage corresponding to the line current. In the disclosed embodiment, this line current has a full scale variation of from 10 to 50 milliamps., but under certain circumstances will vary beyond this range, e.g. from 5 to 70 milliamps.

The measurement voltage across input resistor 14 is connected in series opposition to a "set signal" developed on the output potentiometer 16 of a conventional regulated D.C. power supply 18, e.g. arranged to produce a set signal that is adjustable between 1 and 5 volts. When the measured process condition is at set point, the voltage across resistor 14 will be equal in magnitude and opposite in polarity to the set signal on the potentiometer 16. When the process condition varies from its set point, a corresponding D.C. "deviation" signal will be produced across the input leads 20 with a polarity determined by whether the condition has varied above or below set point.

This deviation signal is applied to an A.C. bridge 24 together with a negative feedback signal appearing across a potentiometer 26. For this purpose, the upper input lead 20 is connected through respective resistors 28 and 30 to opposite terminals 32 and 34 of the bridge, and the potentiometer contact arm 36 is connected through an isolating resistor 38 to the upper terminal 40 of the bridge.

The upper arms of this bridge 24 consist of semi-conductor diodes 42 and 44 the electrical capacitance of which varies in accordance with the voltage applied to the diodes. For that reason, these diodes are shown in the drawing as capacitors, and with a polarity-indicating dot alongside. For the diode voltages used with the disclosed equipment, the diode resistance will be extremely high, in the order of hundreds or thousands of megohms, so that essentially no D.C. current will be drawn. (For further information on such diode elements, reference is made to the above-mentioned Olsen patent.) The lower arms of the bridge are formed by a pair of conventional capacitors 46 and 48, and a trimming capacitor 50 is placed across the right-hand diode 44 to permit initial adjustment of the bridge balance.

With these circuit arrangements, the net voltage represented by the deviation signal (leads 20) in series with the negative feedback signal (potentiometer 26) is applied as a bridge control signal across each of the diodes 42 and 44. When this bridge control signal is zero, the capacitance of the diodes 42 and 44 will be (essentially) equal. However, when this bridge control signal changes from zero to a finite value, the capacitance of one diode 42 will increase while the capacitance of the other diode 44 will decrease, or vice versa, depending upon the polarity of the bridge control signal. Thus, it will be evident that variations in the bridge control signal produce corresponding changes in the balance of the bridge.

The bridge 24 is energized by an A.C. signal through leads 52 connected to the terminals 32 and 34. The bridge A.C. output is taken from the upper and lower terminals 40 and 54 which are connected through a tuned LC circuit 56 to the primary of a transformer 58. The secondary of this transformer drives an A.C. transistor amplifier generally indicated by the block 60, and which may be of conventional construction. This amplifier is provided with a positive feedback circuit comprising the leads 52 which are connected back to the bridge input terminals 32 and 34 for the purpose of producing oscillations through the amplifier.

When the D.C. voltage across the diodes 42 and 44 is zero, the bridge 24 is arranged to be unbalanced (as by adjusting the trimmer capacitor 50) in such a direction as to produce positive feedback around the amplifier 60. Consequently, in this condition the amplifier will develop oscillations (preferably of a relatively high frequency such as 100 kc. or more) and a corresponding A.C. signal will appear in the output circuit 62 of the amplifier.

When the balance of the bridge 24 is changed, as by applying a D.C. bridge control signal of either polarity to the diodes 42 and 44, the amplitude of the A.C. oscillations will change a corresponding amount, either up or down depending upon the polarity of the D.C. bridge control signal. The bridge is arranged in such a manner that it is unbalanced throughout the normal range of D.C. voltage variation across the diodes, so that oscillations will be maintained throughout the operating range of the controller.

The output of the amplifier 60 is in the form of a pulsating signal having a frequency and average magnitude corresponding to the A.-C. oscillations in the amplifier. This pulsating signal passes through the primary of a transformer 64 and an RC filter 66 to a valve-operating device indicated in block outline at 68. This device is shown as including a resistive load, preferably of 600 ohms, to represent the electrical characteristic of the particular device selected.

The pulsating output current flowing through the transformer 64 develops in its secondary winding an alternating signal corresponding in amplitude to the controller output signal. This alternating signal is fed to a negative feedback circuit 70 which includes a pair of rectifiers 72 for developing a D.-C. feedback signal. The feedback signal is filtered by an RC network 74 and is fed to a rate-generating circuit 76 which includes an adjustable series resistor 78 and a shunt capacitor 80 with associated resistors 82, 84 and 86. This rate-generating circuit serves to momentarily delay the passage of the feedback signal through the feedback circuit so as to permit the controller to produce an output signal of substantial magnitude immediately after a sudden change in the process condition being controlled.

The output of the rate-generating circuit 76 is fed to a reset-generating circuit 88 consisting of a series capacitor 90 and a shunt resistance comprising a potentiometer 92 and two resistors 94 and 96. Bridged across these latter resistance elements is the potentiometer 26 referred to previously, and which serves to adjust the proportioning band of the controller by varying the magnitude of the feedback signal fed to the bridge 24.

Considering now the overall operation of the controller when it is controlling a process initially stabilized at set point, it will be assumed that the current through resistor 14 is 30 milliamps., and that the set signal supply 18 is adjusted to 3 volts, so that the deviation signal (20) is zero. Also, the feedback signal across potentiometer 26 will be zero, and accordingly the D.-C. bridge control signal across the diodes 42 and 44 will be zero. For this zero input condition, the bridge 24 normally will be unbalanced (as by means of the trimmer capacitor 50) to provide an output current of 30 milliamps. through the valve-operating device 68.

If, now, there is a change in the controlled process variable such as to decrease the current supplied to the input terminals 10 and 12, a corresponding deviation signal will be fed to the diodes 42 and 44, thereby increasing the capacitance of one of these diodes and decreasing the capacitance of the other. The bridge circuit is so arranged that this further unbalances the bridge, thereby increasing the amplitude of the A.-C. oscillations in the amplifier 60, and increasing the pulsating current flowing through the transformer 64 to the valve-operating device 68.

Accordingly, the D.-C. feedback voltage developed by the rectifiers 72 correspondingly increases to produce a feedback signal which is applied to the reset capacitor 90 (it being assumed in this discussion, merely for the sake of simplicity, that the rate resistor 78 is set for zero rate action). Since the voltage across the reset capacitor cannot change instantaneously, the entire feedback signal initially appears across the potentiometer 26, and a portion thereof (in accordance with the setting of potentiometer 26) is fed to the bridge 24 to oppose the deviation signal appearing across input leads 20.

The gain of the amplifier 60 is made sufficiently high that the signal produced by the feedback circuit 70 is substantially equal in magnitude to the deviation signal.

For example, if the set signal power supply 18 is adjusted to give a 3-volt output (midrange position) and the current through resistor 14 suddenly changes from 30 milliamps. to its normal minimum of 10 milliamps. (1 volt across the resistor) so as to produce a deviation signal of 2 volts, the feedback circuit 70 will produce a feedback signal of about 1.996 volts when the potentiometer 26 is set to its maximum position. Consequently, the voltage applied to the semi-conductor diodes 42 and 44 will have an initial magnitude of only about 4 millivolts.

Subsequently, as the reset capacitor 90 gradually charges up through the resistors 92, 94 and 96 (and the potentiometer 26), the feedback signal decreases and thereby tends to increase the magnitude of the D.-C. voltage across the semi-conductor diodes 42 and 44 so as to increase the output of the controller. Normally, of course, the control action of the valve-operating device 68 in the meantime should have brought the process condition back towards the set point, so that the deviation signal may also have decreased in magnitude. Therefore the net effect may be an actual decrease in the controller output, although in that event the reset action causes the controller output to decrease at a slower rate than it otherwise would.

When such a controller is used to start up a batch process, however, certain problems arise primarily because the measured process condition usually will be outside of the normal operating range of the control system for a considerable time while the process is being "heated up," and may well be outside of the controller "proportioning band" for at least part of this time. For purposes of this description, the proportioning band may be defined as the range of input variation which, without reset action, causes the process valve to move from full closed to full open position. For example, if the controller were used to maintain a temperature at a set point of 300° F., the proportioning band might be set to cover a range of 40° (280° to 320°) represented by an input current variation of from 25 to 35 ma. Thus, if the set signal power supply 18 were adjusted to midrange position (3 volts) to match an input current of 30 ma. at the desired temperature of 300°, the output current of the controller will vary from 50 to 10 ma. (i.e. valve fullopen to full-closed) for an input current variation of from 25 ma. (20° below set point) to 35 ma. (20° above set point).

In starting up such a process, the input current at terminals 10 and 12 will remain at 5 ma. (the actual low limit for the input signal) for a large part of the "heat up" time required to raise the temperature from room temperature to 300°. For this part of the heat up time, the deviation signal at leads 20 will be slightly greater than 2 volts, and the controller output current would tend to remain at 70 ma. Still another period of time must elapse before the input current rises from 5 ma. to 25 ma. at which point the temperature has reached the lower limit of the proportioning band. Thus, for a substantial time the controller output will tend to be above its full-scale upper limit (50 ma.), the valve will be at full-open position, and the D.-C. feedback voltage developed by the rectifiers 72 will be at maximum, in this case above 25 volts. Accordingly, the reset capacitor 90 will steadily accumulate a charge during the relatively long time that the temperature is being brought up to set point.

If no steps are taken to prevent it, the charge on the reset capacitor would continue to accumulate until the capacitor voltage equalled the D.C. voltage developed by the rectifiers 72, thus reducing the voltage across the potentiometer 26 to zero. When the process temperature ultimately reached set point and reduced the deviation signal to zero, the controller output would tend to drop back to its midrange current of 30 ma. This, however, also tends to reduce the D.C. feedback voltage correspondingly and, since the charge on the reset capacitor cannot change instantaneously, a voltage corresponding to the capacitor charge will be developed across potentiometer 26 and fed to the bridge 24. Consequently, the controller output cannot drop to the 30 ma. level, due to the charge that has been accumulated on the reset capacitor while the process has been coming up to temperature, and the temperature therefore will overshoot the set point. Moreover, the reset capacitor charge cannot quickly be dissipated, because of the long time-constant of the reset circuit, and thus the charge on this capacitor will continue to interfere with proper control for some considerable time.

This difficulty, however, is avoided by the present invention which includes novel means for avoiding an excessive build-up of charge on the reset capacitor 90. For this purpose, connected to the output of the controller is a series circuit including a pair of Zener diodes 100 and a resistor 102. When the controller output is within its normal operating range, these diodes prevent the flow of any current through resistor 102. However, when the output current of the controller reaches its full-scale value (50 milliamps. in this case) the voltage developed across the load 68 is sufficient in magnitude to cause the diodes 100 to conduct, and the current flow through resistor 102 will be proportional to the difference between the load voltage and the conduction voltage of the Zener diodes 100.

The signal produced by the flow of current through resistor 102 is amplified by a pair of conventional transistor amplifiers 104 and 106 which are energized by a D.C. power supply 108. The output circuit of the second amplifier 106 comprises the resistor 96 which, as described hereinabove, forms part of the shunt resistance circuit for the reset capacitor 90. When there is a flow of current through the resistor 102, the resulting output current of the amplifier stage 106 produces across resistor 96 a voltage which is polarized to make the left-hand plate of capacitor 90 more positive, and at the same time increase the magnitude of the feedback signal which is applied in series opposition to the deviation signal across the input leads 20.

By thus altering the feedback signal, the bridge control signal is prevented from decreasing further, thereby tending to hold the controller output signal essentially at the threshold value (50 ma.) which produced conduction through the bias arrangement formed by the diodes 100. Moreover, the left-hand plate of the reset capacitor 90 will be held at the potential corresponding to the feedback signal required to maintain the controller output current at the preselected limit. This potential is maintained very precisely due to the relatively high gain of the amplifier stages 104 and 106 and the continuous proportioning action of this amplifier in adjusting the voltage across resistor 96 to the level needed to achieve the preselected controller output current. Accordingly, the controller operation is entirely stable during the time that the batch process is being placed in operation.

Because the potential on the left-hand plate of the reset capacitor 90 is maintained at a proper value whenever the controller output reaches the preselected design limit, the reset capacitor cannot build up an excessive charge while the process condition is outside of the normal operating range of the controller. When the process condition ultimately approaches set point, the consequent reduction in the deviation signal (leads 20) will result in the desired reduction in the controller output signal, without interference from an abnormally high charge on the reset capacitor. As a result, the process condition will not tend unduly to overshoot the set point, and the controller will quickly be able to place the process under proper control. Moreover, it has further been found that this type of control arrangement is particularly well adapted for use with controllers having means to provide rate action (i.e. circuit 76 referred to above), in that smooth and proper operation is obtained even with relatively high rate signals.

FIGURE 2 shows a control system of the "auto-selection" type wherein a single process valve or the like, generally indicated at 68a, is selectively operable by any one of a plurality of identical controllers 120 and 122. These controllers are responsive to measurement signals derived from different variables of the process, e.g. in a pumping control system one controller might be responsive to suction pressure and the other responsive to discharge pressure. The outputs of the controllers are connected together through an isolating circuit comprising respective series diodes 124 and 126, and through an amplifier 128, to the common load 68a. As disclosed in U.S. Patent 2,866,108, with such a series diode arrangement the load current always will correspond to the higher of the controller outputs.

One of the problems encountered with auto-selection systems is that, unless special precautions are taken, the reset capacitor of the "non-selected" controller tends to charge or discharge in such a way as to create instability in the process when the output of that controller subsequently is selected for transmission to the valve. In the above-mentioned patent, this problem is dealt with by the provision of a common feedback connection from the load to the reset circuits of all of the controllers, so that all of the reset capacitors are maintained charged an amount corresponding to the signal actually being fed to the valve. However, this common feedback arrangement is not entirely satisfactory for batch processes, because all of the process conditions may at times be outside of the operating range of the corresponding controllers, and this can result in wind-up of the reset capacitors. In the embodiment of the present invention shown in FIGURE 2, the problem is avoided by the provision of means individual to each controller for maintaining its reset capacitor charged to the proper level.

(Before describing this aspect of the invention, it should be noted that the two controllers 120 and 122 are in many respects similar to the controller shown in FIGURE 1, and to simplify the discussion herein corresponding parts are identified by the same reference numerals with differentiating suffixes.)

Referring now to the upper controller 120, the measurement signal (e.g. having a normal full-scale range of 10–50 ma.) is applied to the input terminals 10a and 12a to develop a measurement voltage across the line resistor 14a. This measurement voltage is connected in series with the output of set-signal power supply 18a, and the resulting deviation signal, combined with a negative feedback signal from feedback circuit 70a (identical to feedback circuit 70 in FIGURE 1), is fed to the A.C. sensing bridge 24a. The output of the bridge is coupled, as in the FIGURE 1 arrangement, to an A.C. transistor amplifier 60a having one D.C. output which energizes the feedback circuit 70a and another D.C. output 62a across which is connected a dummy load resistance 130, e.g. 600 ohms. The output signal developed by this resistor is connected through a transistor 104a and isolating diode 124 to the input resistor 132 (15,000 ohms) of D.C. amplifier 128. Similarly, the output of the lower controller 122 is connected through isolating diode 126 to the input resistor 132.

Assume, now, that the output current of the top controller 120 is 30 ma., and that the output current of the bottom controller is 20 ma. In this condition, current will flow through diode 124 to resistor 132 and develop across this resistor a voltage corresponding to the output voltage of the top controller. Since this voltage is higher than the output voltage of the bottom controller, the diode 126 will be biased to its non-conductive region, and therefore the bottom controller is effectively disconnected from the amplifier 128. If the output of the bottom controller subsequently increases to 40 ma., the diode 126 will conduct, and develop across resistor 132 a voltage corresponding in magnitude to the output of the bottom controller. Thus the valve (68a) will be shifted from a position corresponding to a 30 ma. output current to a position corresponding to a 40 ma. output current.

Since the output current of the top controller 120 now is smaller than that of the bottom controller 122, the diode 124 will be biased toward its non-conductive region, thereby tending to cut off the flow of signal current through transistor 104a, which forms part of an auxiliary feedback circuit. This transistor is so arranged that its output, i.e. the potential between its emitter and collector electrodes, increases when its signal current decreases. This increased output voltage is applied to a second transistor 106a which thereupon produces a flow of current through resistor 96a. The direction of this current flow is such that a negative voltage is developed at the top of resistor 96a and (as is evident from the details of the feedback circuit 70 shown in FIGURE 1) thereby tends to make the feedback signal, fed from feedback circuit 70a to the bridge 24a, more negative.

Accordingly, the output current of the top controller 120 is increased until the voltage across the dummy load 130 is essentially equal to the output voltage of the bottom controller 122. At this point, a very small current (e.g. a few microamperes) will flow through transistor 104a, the amount of this current being just sufficient to develop from circuit 70a the precise amount of feedback voltage required to maintain the output of controller 120 essentially equal to the output of controller 122. If the output of controller 122 changes, there will be a corresponding change in the output of the top controller 120, as long as the output of controller 122 does not drop below the normal output of controller 120 (in the assumed case, 30 ma.). Consequently, the reset capacitor of feedback circuit 70a always is maintained charged to the proper level, corresponding to the actual current being fed to the valve-operating device 68a, so that the transition will be smooth when controller 120 subsequently is selected to operate the valve.

The control system also includes a power supply 134 which is connected through a diode 136 to the input resistor 132. The voltage of this power supply is fixed at the lower operating limit of the controllers (e.g. 6 volts, corresponding to an output current of 10 ma. flowing through a load of 600 ohms). Thus, if the output of both controllers 120 and 122 tends to drop below the normal operating limit, this power supply will furnish current to the amplifier 128 to maintain its input voltage at the lower operating limit. In this case, the auxiliary feedback circuits (transistor 104a, etc.) of both controllers will be activated, as described above, and will operate to maintain both controller output currents at the desired lower limit.

Although specific embodiments of the invention have been set forth in detail, it is desired to emphasize that these are not intended to be exhaustive or necessarily limitative; on the contrary, the showing herein is for the purpose of illustrating the invention and thus to enable others skilled in the art to adapt the invention in such ways as meet the requirements of particular applications, it being understood that various modifications may be made without departing from the scope of the invention as limited by the prior art.

I claim:

1. Electrical control apparatus for use with batch processes and the like, comprising an input circuit for receiving an electrical measurement signal related to the value of a condition of the process, set signal means coupled to said input circuit and arranged to develop a set signal cooperable with said measurement signal for producing a deviation signal corresponding to the difference between the value of said process condition and a desired value thereof, a first amplifier responsive to said deviation signal and having an output circuit, a negative feedback circuit for said first amplifier including a reset capacitor to effect reset action in the output of said amplifier, a reset control circuit coupled to said first amplifier output circuit for selectively adjusting the charge on said reset capacitor whenever said amplifier output signal reaches a predetermined level; said reset control circuit including voltage-sensitive bias means to produce a flow of current corresponding in magnitude to said first amplifier output signal only when said output signal reaches said predetermined level, a second amplifier responsive to said flow of current and adapted to produce an output proportional in magnitude thereto, and circuit means coupling the output of said second amplifier to said reset capacitor to adjust the charge on said reset capacitor so as to maintain the output of said first amplifier at least approximately at said predetermined level.

2. Electrical control apparatus for use with batch processes and the like, comprising an input circuit for receiving an electrical measurement signal related to the value of a condition of the process, a first amplifier responsive to variations in said measurement signal and having an output circuit, a negative feedback circuit adapted to produce a negative feedback signal around said first amplifier, said feedback circuit including a series capacitor and a shunt resistance arranged to coact to effect reset action in the output of said amplifier, a reset control circuit coupled to said first amplifier output circuit for selectively adjusting the charge on said reset capacitor whenever said amplifier output signal reaches a predetermined level; said reset control circuit including biasing means arranged to produce a flow of current in accordance with said first amplifier output signal when said output signal has reached a predetermined threshold value, a second amplifier responsive to said flow of current, and circuit means coupling the output of said second amplifier to said shunt resistance to proportionately adjust said feedback signal so as to maintain the output of said first amplifier at least approximately at said predetermined threshold value and simultaneously maintain the charge on said capacitor at a proper value for the control conditions encountered.

3. Electrical control apparatus for use with batch processes and the like, comprising an input circuit for receiving an electrical measurement signal related to the value of a condition of the process, set signal means coupled to said input circuit and arranged to develop a set signal coacting with said measurement signal for producing a deviation signal corresponding to the difference between the value of said process condition and a desired value thereof, a first amplifier responsive to said deviation signal and having an output circuit, a negative feedback circuit for said first amplifier including a reset capacitor to effect reset action in the output of said amplifier, said feedback circuit being arranged to apply to one side of said capacitor a voltage proportional to said output signal, resistance means connected to the other side of said capacitor to limit the charge and discharge thereof, a reset control circuit coupled to said first amplifier output circuit for selectively adjusting the charge on said reset capacitor whenever said amplifier output signal reaches a predetermined level; said reset control circuit including means to produce an input signal corresponding proportionately with said first amplifier output signal whenever said output signal goes beyond said predetermined level, a second amplifier responsive to said input signal, and circuit means coupling the output of said second amplifier to said other side of said reset capacitor to proportionately adjust the charge on said capacitor so as to maintain the output of said first amplifier at least approximately at said predetermined level.

4. Electronic process control apparatus adapted to receive an electrical measurement signal corresponding to a process condition to be controlled, and including means to develop an electrical output signal for operating a device adapted to influence said process condition; said control apparatus comprising an electrical amplifier responsive to said measurement signal and having an output circuit to develop an output signal for transmission to said device, a negative feedback circuit including a series-connected capacitor coupled to the input of said amplifier for introducing reset action in said amplifier output signal, a reset control circuit comprising signal-sensitive means coupled to said amplifier output circuit and arranged to produce a reset control signal whenever said amplifier output signal reaches a predetermined level, and means responsive to said reset control signal for adjusting the charge on said capacitor so as to prevent reset wind-up.

5. Electronic process control apparatus adapted to receive a D.C. measurement signal corresponding to a process condition to be controlled, and including means to develop an electrical output signal for operating a device adapted to influence said process condition; said control apparatus comprising a first amplifier responsive to said measurement signal and having an output circuit to develop an output signal for transmission to said device, a D.C. negative feedback circuit including a series-connected capacitor coupled to the input of said first amplifier for introducing reset action in said amplifier output signal, a reset control circuit including bias means coupled to said first amplifier output circuit to produce a reset control signal corresponding to said output signal whenever said amplifier output signal reaches a predetermined threshold level, and a second amplifier responsive to said reset control signal and having its output coupled to said capacitor to variably adjust the charge thereon so as to prevent reset wind-up.

6. Electrical control apparatus for use with batch processes and the like, comprising an input circuit for receiving an electrical measurement signal related to the value of a condition of the process, set signal means coupled to said input circuit and arranged to develop a set signal coacting with said measurement signal for producing a deviation signal corresponding to the difference between the value of said process condition and a desired value thereof, a first amplifier responsive to said deviation signal and adapted to produce an output signal for controlling the process condition, a negative feedback circuit for producing a feedback signal for said first amplifier and including a reset capacitor to effect reset action in the amplifier output, and a reset control circuit for adjusting the charge on said reset capacitor, said reset control circuit including a second amplifier responsive to the signal level in said first amplifier and arranged to control the charge on said capacitor to inhibit further changes in said signal level whenever said signal level goes beyond a predetermined value.

7. Electrical control apparatus of the proportioning type and adapted for use with batch processes and the like, comprising an input circuit for receiving an electrical measurement signal related to the value of a condition of the process, set signal means coupled to said input circuit and arranged to develop a set signal coacting with said measurement signal for producing a deviation signal corresponding to the difference between the value of said process condition and a desired value thereof, a first amplifier responsive to said deviation signal and arranged to develop an output signal for transmission to a condition-influencing device, a negative feedback circuit for producing a feedback signal for said first amplifier and including a reset capacitor to effect reset action in the amplifier output; a reset control circuit responsive to the signal level in said first amplifier for adjusting the charge on said reset capacitor, said reset control circuit including a second amplifier having an output circuit coupled to said capacitor for controlling the charge on said capacitor, said second amplifier including bias means normally operable to deactivate said second amplifier and to permit said second amplifier to adjust said capacitor charge so as to minimize further changes in said first amplifier signal lever whenever said signal level goes beyond a predetermined value.

8. Electrical control apparatus of the proportioning type and adapted for use with batch processes and the like, comprising an input circuit for receiving an electrical measurement signal related to the value of a condition of the process, set signal means coupled to said input circuit and arranged to develop a set signal coacting with said measurement signal for producing a deviation signal corresponding to the difference between the value of said process condition and a desired value thereof, a first amplifier responsive to said deviation signal and arranged to develop an output signal for transmission to a condition-influencing device, a negative feedback circuit for producing a feedback signal for said first amplifier and including a reset capacitor to effect reset action in the amplifier output; a reset control circuit including a second amplifier having an input circuit responsive to the signal level in said first amplifier, the output circuit of said second amplifier being coupled to said reset capacitor for adjusting the charge on said reset capacitor, said second amplifier including biasing means normally operable to deactivate said second amplifier while the first amplifier signal level has a value within a predetermined range corresponding to the process condition being within the proportioning band of the controller, said biasing means being arranged to activate said second amplifier whenever said first amplifier signal level goes beyond said predetermined range, said second amplifier serving to limit the transfer of said capacitor charge when said first amplifier signal level corresponds to said condition being outside the proportioning band.

9. Electrical control apparatus of the proportioning type and adapted for use with batch processes and the like, comprising an input circuit for receiving an electrical measurement signal related to the value of a condition of the process, set signal means coupled to said input circuit and arranged to develop a set signal coacting with said measurement signal for producing a deviation signal corresponding to the difference between the value of said process condition and a desired value thereof, a first amplifier responsive to said deviation signal and arranged to develop an output signal for transmission to a condition-influencing device, a negative feedback circuit for producing a feedback signal for said first amplifier and including a reset capacitor to effect reset action in the amplifier output, said feedback signal being connected in series opposition to said deviation signal; a reset control circuit including a second amplifier having its output coupled to said reset capacitor to adjust the charge on said capacitor, said second amplifier being responsive to the combined voltage represented by said deviation and feedback signals and including biasing means operable to permit said second amplifier to adjust the charge on said capacitor only when said combined voltage has reached a preselected value corresponding to one limit of the full-scale operating range of the control apparatus, said second amplifier serving to adjust the charge on said capacitor in a direction to tend to maintain said combined voltage within the full scale operating range of the control apparatus.

10. Electrical control apparatus for use with batch processes and the like, comprising an input circuit for receiving an electrical measurement signal related to the value of a condition of the process, a first amplifier responsive to variations in said measurement signal and having an output circuit, a negative feedback circuit adapted to produce a negative feedback signal around said first amplifier, said feedback circuit including a series capacitor and a shunt resistance arranged to effect reset action in the output of said amplifier, a reset control circuit coupled to said first amplifier output circuit for selectively adjusting the charge on said reset capacitor whenever said amplifier output signal reaches a predetermined level; said reset control circuit including at least one reverse-polarized Zener diode arranged to produce a flow of current in accordance with said first amplifier output signal when said output signal has reached a predetermined threshold value, a second amplifier having an input circuit responsive to said flow of current, and circuit means connecting at least a portion of said shunt resistance in the output circuit of said second amplifier to receive the output current thereof and thereby proportionately adjust said feedback signal so as to maintain the output of said first amplifier at least approximately at said predetermined threshold value, whereby the charge on said capacitor is adjusted to a proper value for the control conditions encountered.

11. Electronic process control apparatus of the proportioning type adapted to receive an electrical measurement signal corresponding to a process condition to be controlled, and including means to develop a corresponding electrical output signal for operating a device adapted to influence said process condition; said control apparatus comprising an electrical amplifier responsive to said measurement signal and including an output circuit to develop an output signal for transmission to said device, circuit means including a capacitive element coupled to the input of said amplifier for introducing reset action in said output signal, and a reset control circuit including means responsive to said output signal and coupled to said capacitor to proportionately adjust the charge thereon so as to tend to maintain said output signal at a preselected limiting value and to adjust the input signal for said amplifier so that it remains within the normal operating range of said amplifier while said process condition varies beyond the full-scale operating range of the control apparatus.

12. Electronic process control apparatus adapted to receive an electrical measurement signal corresponding to a process condition to be controlled, and including means to develop an electrical output signal for operating a device adapted to influence said process condition; said control apparatus comprising an electrical amplifier responsive to said measurement signal and including an output circuit to develop an output signal for transmission to said device, circuit means including means coupled to the input of said amplifier for introducing rate and reset action in said output signal, said reset means comprising a capacitive element, and a reset control circuit including signal-sensitive means coupled to said amplifier output circuit and operable whenever said output signal reaches a predetermined threshold level to adjust the charge on said capacitive element in proportion to changes in the level of said output signal beyond said threshold level so as to produce an output signal within the normal operating range of said amplifier while the process condition is beyond the normal operating band of the control apparatus.

13. Electronic process control apparatus adapted to receive an electrical measurement signal corresponding to a process condition to be controlled, and including means to develop an electrical output signal for operating a device adapted to influence said process condition; said control apparatus comprising an electrical amplifier responsive to said measurement signal and having an output circuit to develop an output signal for transmission to said device, a negative feedback circuit including a shunt rate capacitor and a series reset capacitor coupled to the input of said amplifier for introducing rate and reset action in said amplifier output signal, a reset control circuit comprising signal-sensitive means coupled to said amplifier output circuit and arranged to produce a reset control signal whenever said amplifier output signal reaches a predetermined level, and means responsive to said reset control signal for adjusting the charge on said reset capacitor whenever said amplifier output signal goes beyond said predetermined level.

14. For industrial process control systems of the type wherein a plurality of controllers are arranged to selectivvely control a single characteristic of the process, apparatus comprising first and second controllers each having an output circuit and a reset circuit, an operating device for altering said process characteristic, isolating circuit means connecting said controller output circuits to said operating device and including means to transmit to said device a signal corresponding to a selected one of said controller outputs in accordance with which output is the larger, first and second auxiliary feedback circuits for said controllers respectively, said feedback circuits being coupled between the respective controller output and input circuits, each of said feedback circuits including means responsive to the output current fed by the respective controller through said isolating means and operable, as the output current of the non-selected controller tends to go to zero, to adjust the input signal of that controller so as to maintain the output of the non-selected controller at a value substantially corresponding to the signal being fed to said operating device, whereby said reset circuits are continuously maintained in proper electrical condition.

15. An industrial process control system comprising first and second controllers each having an output circuit, operating means for altering a characteristic of the process, voltage selection means including first and second unidirectional current transmitting elements connecting said output circuits respectively to said operating means so that said device receives a signal corresponding to the larger one of the controller outputs; first and second feedback circuits for said controllers, said feedback circuits being coupled to the corresponding output circuit and including a reset capacitor; signal limiting means coupled to said operating means to assure that the signal fed to said operating means does not go beyond a predetermined limit; first and second auxiliary feedback circuits coupled to the inputs of said controllers respectively, said auxiliary feedback circuits being responsive to the flow of current through the corresponding unidirectional current transmitting element and operable to adjust the input signal of the non-selected controller so as to maintain the output of the non-selected controller substantially equal to the signal fed to said operating means.

16. An industrial process control system comprising first and second controllers each having an output circuit, an operating device for altering a characteristic of the process, first and second rectifier means connecting said output circuits respectively to said operating device so that said device receives a signal corresponding to the larger one of the controller outputs; first and second function-generating feedback circuits for said controllers, said feedback circuits being coupled to the corresponding output circuit and including a reset capacitor; first and second auxiliary feedback circuits for said controllers respectively, each of said auxiliary feedback circuits including a current-responsive element connected in series with said rectifier means respectively and including respective means coupled to the reset capacitor of the corresponding function-generating feedback circuit to adjust the feedback signal developed by the corresponding one of said function-generating feedback circuits so as to maintain the output of the non-selected controller substantially equal to the signal being fed to said operating device.

17. A control system as set forth in claim 16, wherein said current-responsive element comprises a transistor amplifier, the output of said transistor amplifier being coupled to the corresponding reset capacitor.

18. For industrial process control systems of the type wherein a plurality of controllers are arranged to selectively control a single characteristic of the process, apparatus comprising first and second controllers each having an output circuit with a load resistance to receive the controller output current, first and second reset feedback circuits for said controllers respectively, an operating device for altering said process characteristic, first and second rectifying means for coupling said load resistances to said operating device to transmit to said device a signal corresponding to a selected one of said controller output currents in accordance with which output is the larger; and first and second auxiliary feedback circuits for said controllers respectively; said feedback circuits including current-sensing means in series with the corresponding rectifying means and operable to maintain the output current of the non-selected controller substantially equal to the current being fed to said operating device.

19. Apparatus as set forth in claim 18, including a voltage source, and a third rectifying means coupling said voltage source to said operating device to establish a lower operating limit for the outputs of said controllers.

20. Electronic process control apparatus for use with batch-type processes, said control apparatus comprising an electrical amplifier responsive to a deviation signal and including an output circuit to develop a control signal for transmission to a device adapted to influence the process condition; feedback means for developing at the input circuit of said amplifier a negative feedback signal in opposition to said deviation signal so that the input signal to said amplifier corresponds to the difference between said deviation signal and said feedback signal; said feedback means including a capacitor for introducing reset action in the output signal of said amplifier; a reset control circuit responsive to said output signal and operable when said output signal is beyond the normal operating range of said amplifier while the process condition is approaching the control set point, said reset control circuit including means for altering the charge on said capacitor to produce at said input circuit a negative feedback signal effective to develop an input signal within the normal operating range of said amplifier while said deviation signal is beyond the normal operating range of the amplifier.

References Cited by the Examiner

UNITED STATES PATENTS

| | | | |
|---|---|---|---|
| 2,428,039 | 9/47 | Royden | 330—86 |
| 2,866,106 | 12/58 | Schuh. | |
| 2,866,108 | 12/58 | Olsen et al. | 307—149 |
| 2,956,234 | 10/60 | Olsen | 330—10 |
| 3,005,163 | 10/61 | Dulberger et al. | 330—10 |

ROY LAKE, *Primary Examiner.*

BENNETT G. MILLER, *Examiner.*